United States Patent [19]

Diachuk

[11] 4,350,504

[45] Sep. 21, 1982

[54] AIR CLEANING SYSTEM

[75] Inventor: Wolodymyr Diachuk, Minneapolis, Minn.

[73] Assignee: Century 21 Pollution Control, Inc., Minneapolis, Minn.

[21] Appl. No.: 116,222

[22] Filed: Jan. 28, 1980

[51] Int. Cl.³ ...................... B01D 46/42; B01D 46/52; B01D 50/00; B01D 53/34
[52] U.S. Cl. ...................... 55/217; 55/274; 55/279; 55/282; 55/288; 55/316; 55/323; 55/329; 55/466; 55/481; 55/483; 55/484; 55/DIG. 36; 126/299 C; 126/299 F; 422/122; 422/169
[58] Field of Search ................. 55/213, 217, 274, 279, 55/282, 288, 316, 323, 328, 329, 444, 466, 481, 484, 485, DIG. 36, 321, 322, DIG. 10; 126/299 C, 299 D, 299 F; 422/120, 122, 169

[56] References Cited

U.S. PATENT DOCUMENTS

| | | | |
|---|---|---|---|
| 2,084,408 | 6/1937 | Mueller | 55/481 |
| 2,130,806 | 9/1938 | Link | 55/484 |
| 2,577,150 | 12/1951 | Pledeer | 55/DIG. 36 |
| 2,802,546 | 8/1957 | Clark | 55/316 |
| 2,886,124 | 5/1959 | Scharmer | 55/484 |
| 3,065,637 | 11/1962 | Graswich et al. | 126/299 D |
| 3,131,687 | 5/1964 | Kalla | 126/299 |
| 3,260,189 | 7/1966 | Jensen | 98/115 |
| 3,566,585 | 3/1971 | Voloshen et al. | 55/DIG. 36 |
| 3,577,710 | 5/1971 | Feldman | 55/279 |
| 3,744,216 | 7/1973 | Halloran | 55/279 |
| 3,785,124 | 1/1974 | Gaylord | 55/DIG. 36 |
| 3,802,158 | 4/1974 | Ohle | 55/DIG. 36 |
| 3,811,250 | 5/1974 | Fowler, Jr. | 55/274 |
| 3,812,370 | 5/1974 | Laviolette | 55/274 |
| 3,870,494 | 3/1975 | Doane | 55/DIG. 36 |
| 3,930,803 | 1/1976 | Winter | 55/288 |
| 3,936,284 | 2/1976 | Mason | 55/274 |
| 4,040,042 | 8/1977 | Mayer | 126/299 D |
| 4,050,291 | 9/1977 | Nelson | 55/274 |
| 4,143,646 | 3/1979 | Sampsel | 126/299 D |

FOREIGN PATENT DOCUMENTS 2813691 10/1979 Fed. Rep. of Germany ........ 55/484
888823 2/1962 United Kingdom ........... 126/299 D

OTHER PUBLICATIONS

Gaylord Industries, Lake Oswego, Oreg., The Gaylord, Form SPC-71, pp. 1-6.
Air Systems, Wheeling, Ill., 8/73, X-Air Grease Filter.
Environmental Science and Technology, vol. 12, No. 10, Oct. 1978, pp. 1138-1149, "Cleanup: That Old Black Magic Works Again!".
Posslet & Reidies, Odor Abatement with Potassium Permagnate Solutions, vol. 4, Mar. 1965, pp. 48-50.

*Primary Examiner*—David L. Lacey
*Attorney, Agent, or Firm*—Burd, Bartz & Gutenkauf

[57] ABSTRACT

A cooking unit having a hood equipped with air cleaning structures and blowers for moving air through the cleaning structures. The air cleaning structures include a pre-filter having spaced baffles for collecting air borne greases and particles. A primary fiber filter and secondary charcoal and oxidizer beds are located downstream of the pre-filter. A high efficiency filter is located downstream of the secondary cleaning beds. A damper behind the pre-filter closes in response to an increase in temperature of the air moving through the filters. A separate heating unit is used to reactivate the charcoal.

18 Claims, 14 Drawing Figures

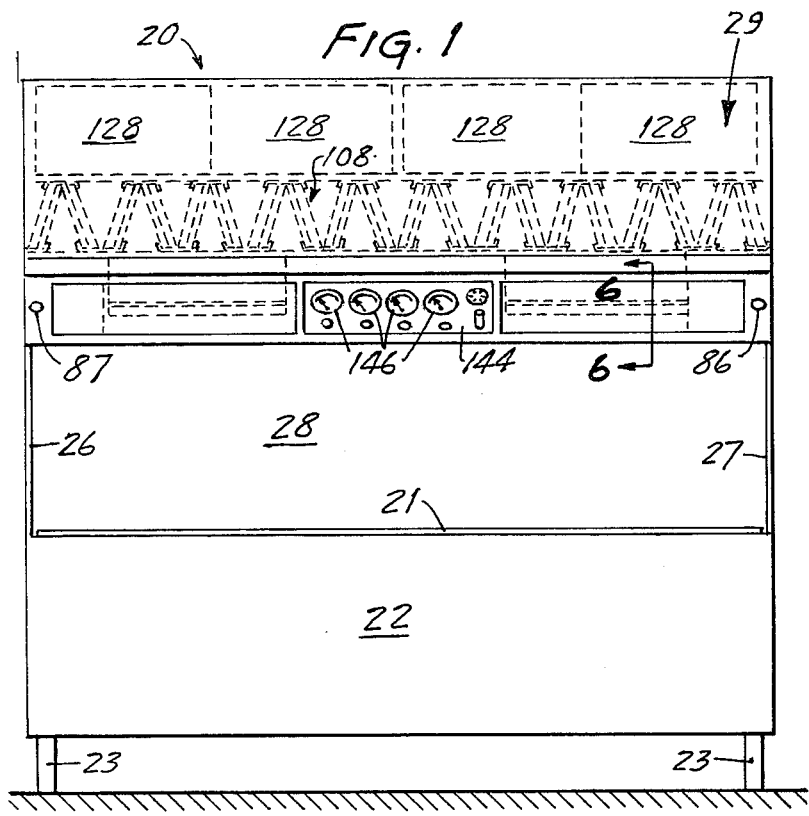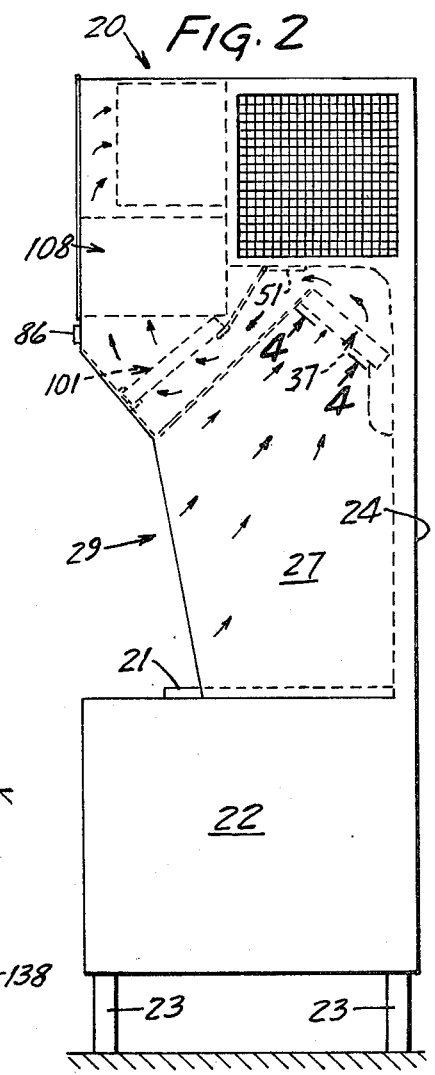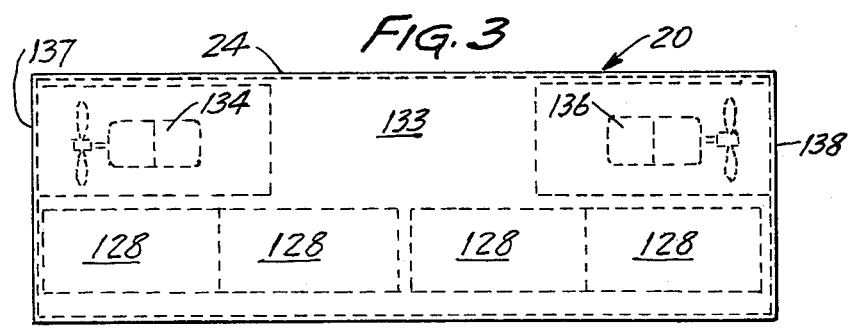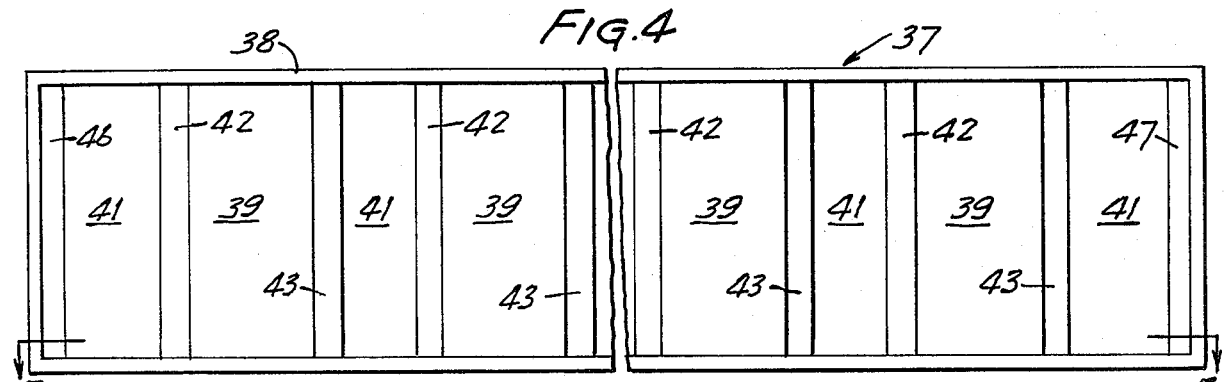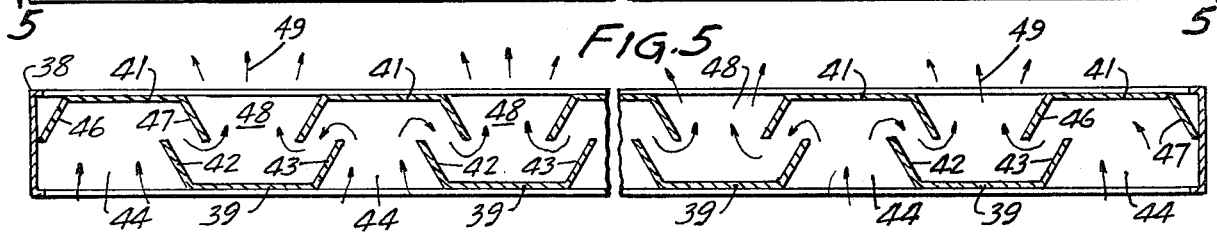

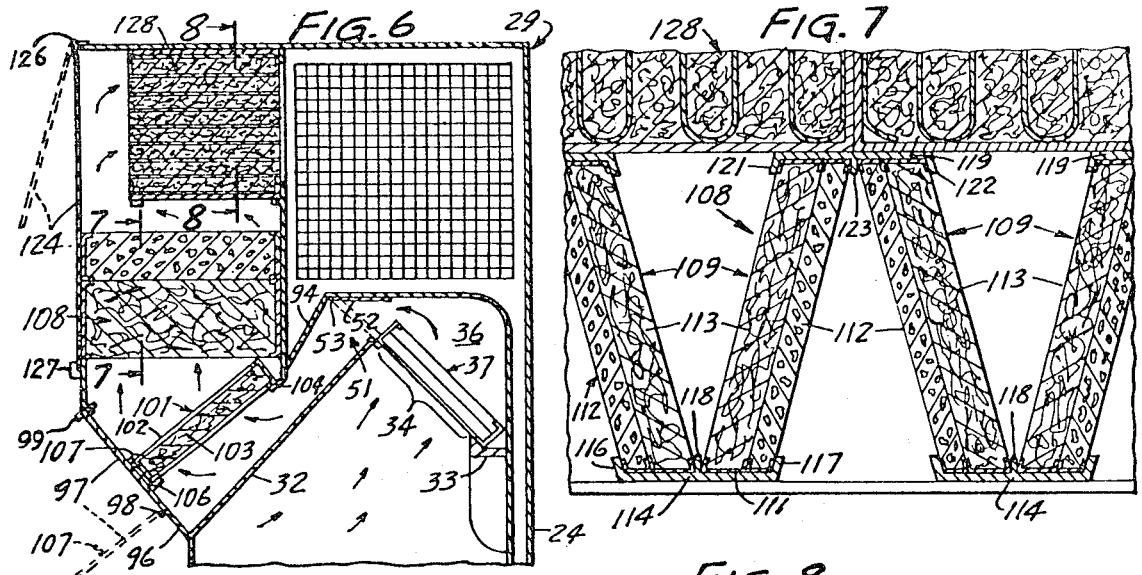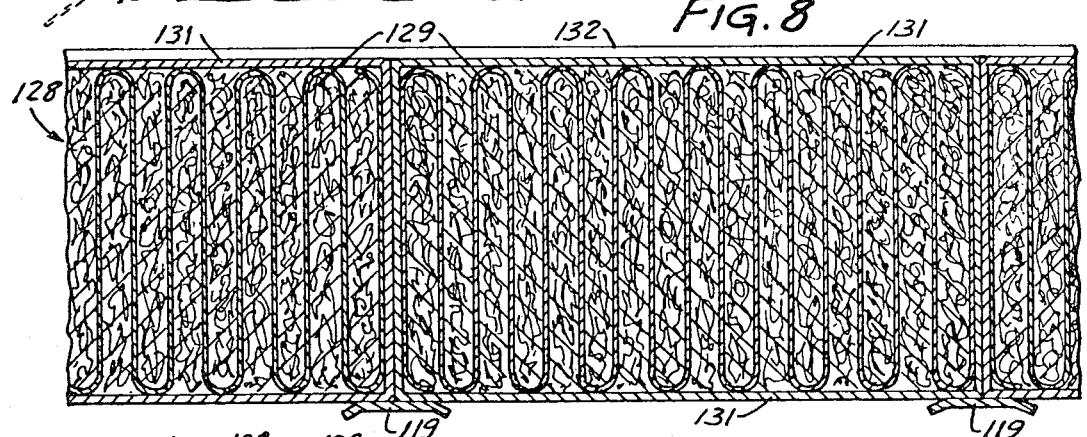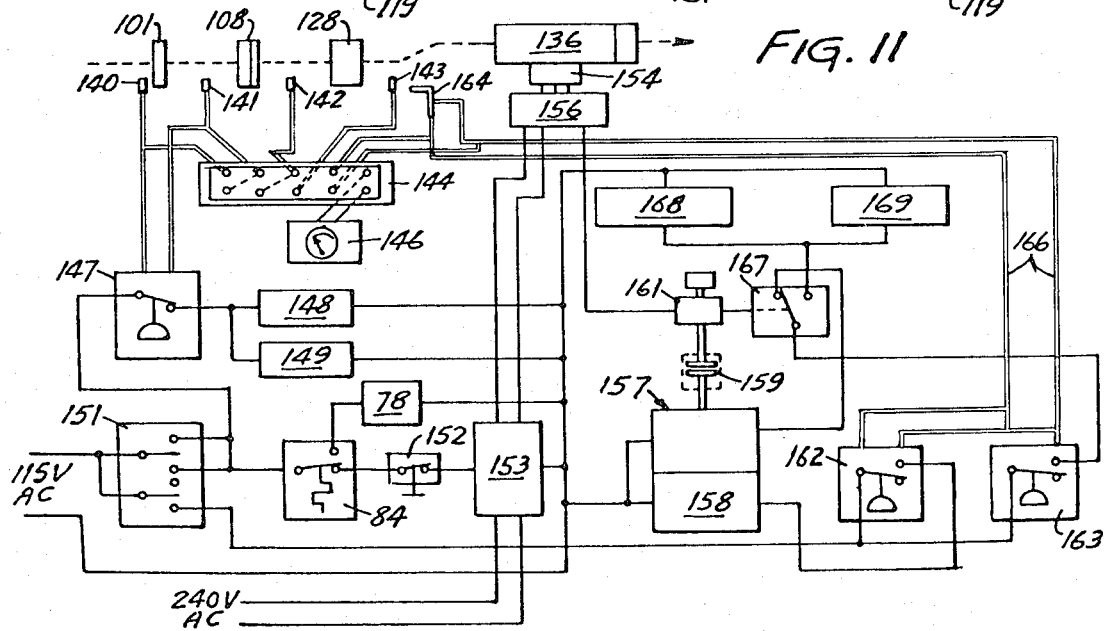

AIR CLEANING SYSTEM

BACKGROUND OF INVENTION

Hoods and suction blowers are used to collect vapors, greases and odors from ranges and cooking units and discharge these materials to the outside atmosphere. The hoods are located above the range and ovens and have fans which draw the cooking pollutants through the hoods of the outside of the structure. In commercial installations large amounts of smoky and grease-laden air is discharged to the atmosphere. This practice results in large heat losses and air pollution. Ventilating systems which utilize filters and blowers to recirculate the air through the cooking unit have been developed. Examples of these systems are shown by Jenson in U.S. Pat. No. 3,260,189 and Gaylord in U.S. Pat. No. 3,785,124.

SUMMARY OF INVENTION

The invention is directed to an air cleaning system for removing greases, particulates and odors from a gas or air. The system has a passage carrying air through an air pre-filter and a plurality of air filters. The pre-filter has a plurality of baffles which collect greases and large particles. A damper assembly located behind the pre-filter automatically closes in the event of a fire in the system. The plurality of filters includes a primary fiber filter and secondary air treating means of filters, as a charcoal bed and an odor oxidizer media. The last filter is a high efficiency filter, such as a HEPA filter. The air is moved through the filters with air moving means located adjacent the exit opening of the system. In one form of the invention an external heat source is used to purge foreign materials from the charcoal bed. An afterburner is used to burn the material removed from the charcoal.

An object of the invention is to provide an air cleaning apparatus with separate filters to remove greases and large particles, small particles, bacteria, airborne viruses and odors from a gas moving through the filter. Another object of the invention is to provide an air cleaning apparatus with a pre-filter which minimizes grease on downstream ducts and air moving fans so as to reduce fire hazards and periodic cleaning. A further object of the invention is to provide an air cleaning apparatus which does not produce ozone. Yet another object of the invention is to provide an air cleaning apparatus which does not add moisture to the air and cleans air at a temperature about the same as the temperature of the air moving into the apparatus, thereby conserving energy. Another object of the invention is to provide an air cleaning apparatus which has substantially constant flow of air through the apparatus as particulates, odors and foreign material are collected by filters in the apparatus. Yet another object of the invention is to provide an air cleaning apparatus for cooking equipment with the apparatus located in the hood so that the structure of the cleaning apparatus can be readily replaced and cleaned and does not interfere with the flow of air into the hood.

IN THE DRAWINGS

FIG. 1 is a front elevational view of cooking equipment having the air cleaning system of the invention;

FIG. 2 is a side elevational view of FIG. 1;

FIG. 3 is a top plan view of FIG. 1;

FIG. 4 is an enlarged front view of the pre-filter shown in FIG. 2, looking in the direction of arrows 4—4;

FIG. 5 is an enlarged sectional view taken along line 5—5 of FIG. 4;

FIG. 6 is an enlarged transverse side view, partly sectioned, of the filter arrangement and fire damper assembly;

FIG. 7 is an enlarged sectional view taken along line 7—7 of FIG. 6;

FIG. 8 is an enlarged sectional view taken along line 8—8 of FIG. 6;

FIG. 11 is an electrical-mechanical diagram of the controls for the air cleaning system of the invention.

DESCRIPTION OF PREFERRED EMBODIMENTS

Figure 9:
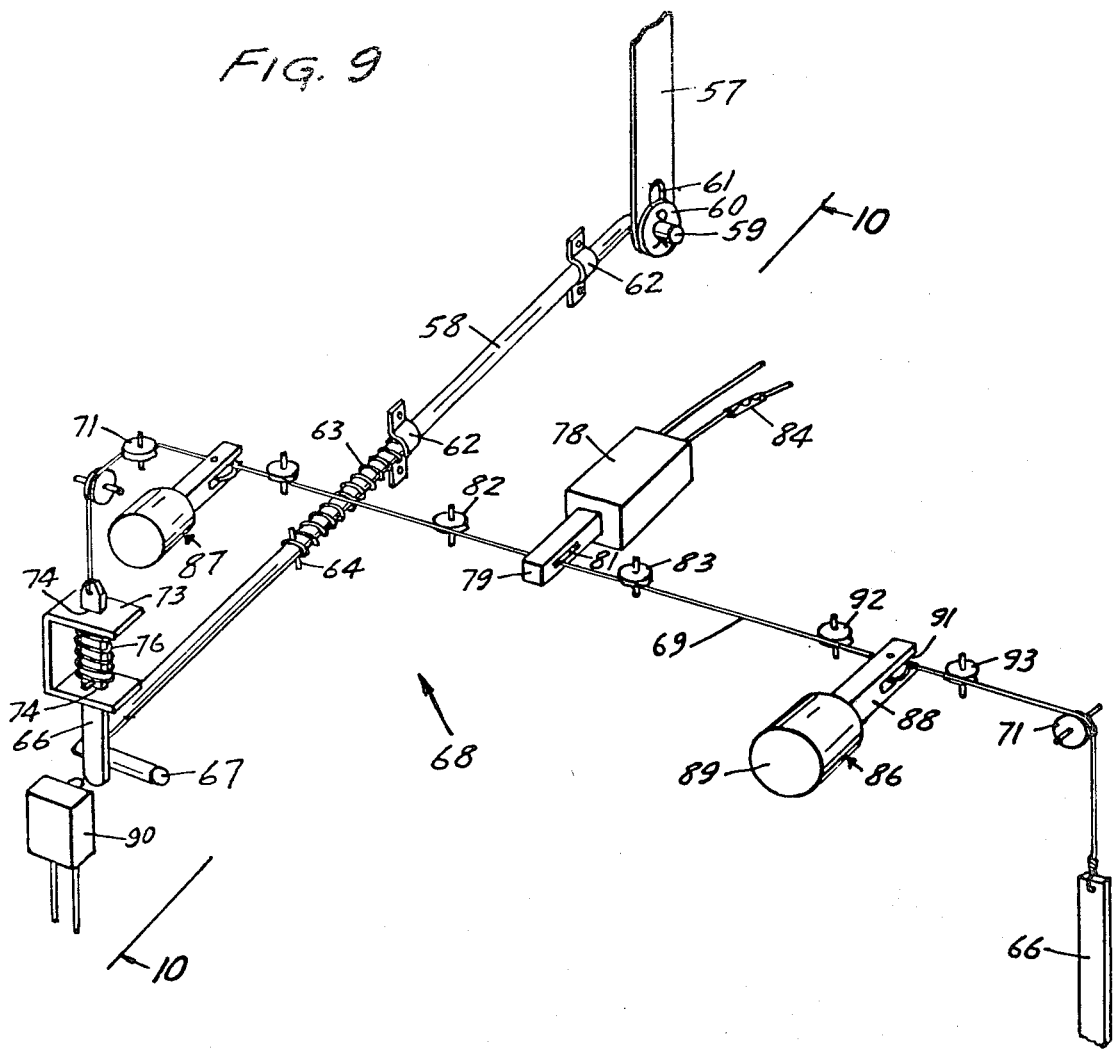
FIG. 9 is an enlarged perspective view of the control apparatus for the fire damper.

Referring to FIG. 1, there is shown cooking equipment or a stove indicated generally at 20 having a horizontal cooking plate 21. Plate 21 is mounted on a housing 22 enclosing the heat source, such as gas burners or the like (not shown). Housing 22 is supported by a plurality of upright legs 23. A generally flat wall-like structure 24 projects upwardly from housing 22 behind plate 21. Side walls 26 and 27 project forwardly from opposite sides of wall 24 and form with the wall a space or area 28 above cooking plate 21. Area 28 is enclosed except for a front opening providing access to the plate 21.

The top of space 28 is closed with a hood assembly indicated generally at 29 containing the air cleaning apparatus of the invention. As shown in FIG. 2, the air cleaning system of the invention is operable to draw air through the front opening of space 28 and move the air through the hood assembly 29. Clean air is discharged from opposite sides of the top of the hood assembly 29.

As shown in FIG. 6, hood assembly 29 has a housing with a bottom wall 32. Wall 32 extends upwardly and rearwardly and is spaced from a transverse lip or flange 33 secured to the front side of back wall 24. The upper end of bottom wall 32 and lip 33 forms a transverse inlet opening 34. Inlet opening 34 is open to a passage 36. A pre-filter indicated generally at 37 is located in the inlet opening to collect grease and large particles of materials moving with the air through the pre-filter.

Referring to FIGS. 4 and 5, there is shown the structure of the pre-filter 37. Filter 37 has a rectangular frame 38 carrying a plurality of particle collection plate members 39 and 41. The number of interrelated plate members 39 and 41 can vary depending on the size of each plate member and the length of the pre-filter. FIG. 5 shows a cross sectional detail of the plate members 39 and the relationship of these plate members with the rear plate members 41. Plate member 39 has a forwardly and outwardly directed flange 42 extended the length of the plate member. Extended outwardly and forwardly from the opposite side of the plate member 39 is a second vertical flange 43. Flanges 42 and 43 diverge in a forwardly direction or direction of flow of air through the pre-filter. The flanges 39 and 41 of adjacent members 39 are spaced from each other to provide air inlet passages 44 for the air.

The plate members 41 have rearwardly and outwardly directed side flanges 46 and 47. The flanges 46 and 47 extend parallel to each other and are spaced from each other by air outlet passages 48. The ends of the flanges 42, 43 and 46,47 are located along the central transverse plane of the filter 37. The frame 38 and plate members 39 and 41 are metal, such as stainless steel. The opposite ends of the plate members 39 and 41 are secured by welds to frame 38. The air, indicated by arrows 49, flows through the filter 37 at a relatively high velocity and has a number of changes in direction. Particles, such as grease, will impinge on the plate members 39 and 41 and thereby extract the grease from the air. Pre-filter 37 is non-clogging and self-draining. Filter 37 can be readily removed and cleaned, such as by washing with a commercial dishwasher.

A damper assembly indicated generally at 51 in FIG. 6 is located adjacent the upper end of the pre-filter 37. Damper assembly 51 is operable in response to an increase in the temperature of the air in the system to close the passage 36 to prevent the flow of air through the hood assembly. The damper assembly 51 comprises a plate 52 mounted on the housing with a hinge 53. A shaft 54 is connected to the plate 52, shown in FIG. 10, so that rotation of the shaft 54 will move the plate 52 from the open position, as shown in full lines in FIG. 6, to the closed position, as shown in broken lines. When plate 52 is in the closed position, passage 36 is closed, thereby preventing more air from flowing through the hood to control fire or any malfunctioning of the system downstream from damper assembly 51.

Figure 10:
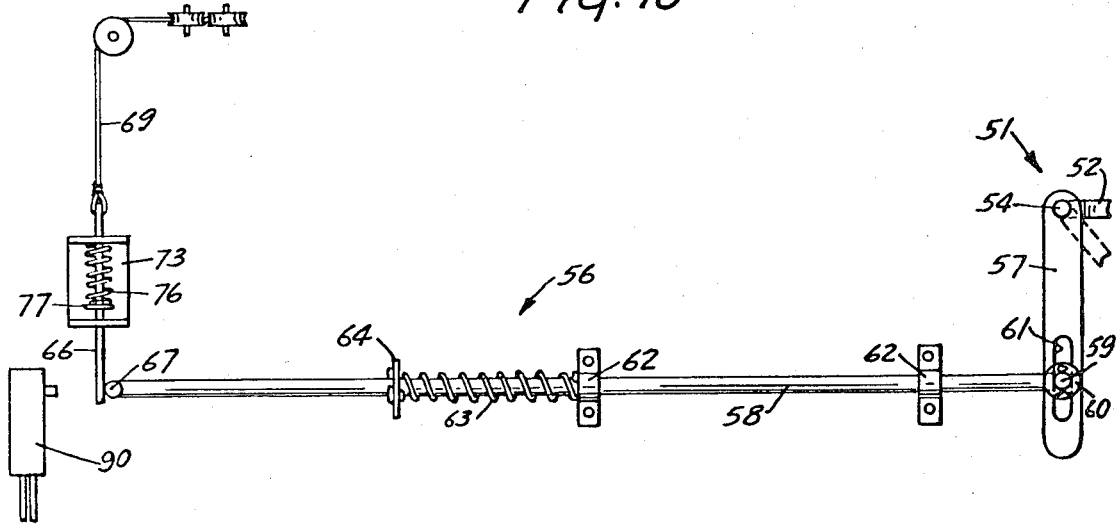
FIG. 10 is a side view of the control apparatus for the fire damper taken along line 10—10 of FIG. 9.

Referring to FIGS. 9 and 10, a control mechanism indicated generally at 56 is used to operate the damper assembly 51. Control mechanism 56 comprises an arm 57 secured to shaft 54. A longitudinally movable control rod 58 is pivotally connected to the lower end of arm 57. Rod 58 has a turned end 59 extended through slot 61 in arm 57. Fastening means such as a washer and cotter key 60 hold the rod 58 in assembled relation with arm 57. Rod 58 is slidably mounted on a pair of brackets 62 secured to the housing of the hood. A spring 63 positioned about a portion of rod 58 and engageable with a stop 64 secured to the rod 58 functions to bias the rod 58 in an outward direction to urge the arm in a direction for closing the plate 52. A releasable stop 66 holds the rod 58 in a position wherein the plate 52 is open. The stop 66 can be released in response to manual movement or temperature responsive structure hereinafter described.

The releasable stop 66 is controlled with an actuator system indicated generally at 68 in FIG. 9. Actuator system 68 comprises a generally horizontal cable 69 having opposite ends attached to the upper ends of the releasable stops 66. The stops 66 are rod members having upper ends provided with holes to accommodate the ends of cable 69. Cable 69 is trained over end pulleys 71 rotatably mounted on the housing of the hood 29. The stops 66 on the opposite side of the housing are identical in construction and function. The following description is limited to one stop. The stop comprising an upright rod 66 is mounted in a bracket 73 secured to the housing of hood 29. Bracket 73 has inwardly directed flanges with aligned vertical holes 74 accommodating the rod 66. A spring 76 positioned about rod 66 engages the upper flange of bracket 73 and a stop washer 77 mounted on the rod 66. The spring 76 biases rod 66 in a downward direction and places the cable 69 under tension. Also, the spring 76 biases the lower end of rod 66 into operative abutting engagement with the end 67 of control rod 58.

A solenoid 78 is mounted on the housing of the hood 29. Solenoid 78 has a movable plunger 79. The outer end of plunger 79 has a hole 81 accommodating the cable 69. A pair of pulleys 82 and 83 are located on opposite sides of plunger 79 and engage and guide cable 69. Solenoid 78 is electrically connected to a temperature responsive element or fuse 84. Element 84 functions in response to an increase in temperature of air in the passage of the hood, such as resulting from a fire, to activate the solenoid 78 whereby the plunger 81 will move into the solenoid body and pull the stops 66 in an upward direction and out of operative engagement with the control rod end 67. This action will automatically shut the damper plate 52 to starve the air to the fire.

The cable 69 can be manually actuated to close the damper plates 52. A pair of manual actuators 86 and 87 are located on opposite sides of the hood 29, as shown in FIG. 1. Returning to FIG. 8, manual actuators 86 and 87 are identical in construction. The following description is limited to manual actuator 86.

Manual actuator 86 has a horizontal rod 88 carrying a button 89. Button 89 is exposed to the exterior of the hood so that it can be conveniently pressed. The inner end of rod 88 has a transverse hole 91 to accommodate cable 69. A pair of pulleys 92 and 93 engage the cable 69 on opposite sides of the rod 88 so that on depression of button 89 the cable will move the rod 66 out of operative engagement with the end 67. This will permit spring 63 to move control rod 58 and damper plate 52 to the closed position.

A switch 90 is mounted on the hood housing in alignment with the rod end 67. Switch 90 is connected to the electric circuit for the motor operating the blower for the air cleaning system. When switch 90 is actuated by the rod end 67 the motor circuit is opened to stop the motor. This stops the movement of air through the system thereby limiting the fire hazard condition that may exist in the hood 29.

Referring to FIG. 6, the housing for hood 29 has an inside wall 94 forming the top wall of passage 36 and a front wall 96. The front wall 96 has a transverse opening closed with a door 97. Hinge structure 98 pivotally mounts the lower portion of the door to the bottom wall 32. A fastener or latch 99, such as a bolt, releasably attaches door 97 to the front wall 96 to hold the door in the closed position.

A primary air filter 101 is located in passage 36 behind door 97. The primary filter has a peripheral frame 102 carrying filtering medium 103. The filtering medium 103 is a porous fiber material, as glass fibers or the like. The fibers may be viscose coated or a dry type. The deposition or entrapment of particulate material is achieved with a number of mechanisms including centrifugal forces, diffusional forces, and electrostatic forces. The air traveling through medium 103 is dispersed into many small streams that bring the entrained particulates into contact with the filter fibers to which they adhere.

The primary filter 101 is removably positioned in passage 36. A transverse member 104 is secured to wall 94 and accommodates the rear portion of filter frame 102. The front of filter 101 is located on a transverse angle member 106, thereby positioning primary filter 101 across the passage 36. The frame 102 is held in angle member 106 by projection or tab 107 secured to the inside of door 97.

Referring to FIG. 1, a secondary filter arrangement indicated generally at 108 extends transversely across the hood 29 downstream of the primary filter 101. The secondary filter comprises a plurality of diagonally arranged filter units 109. As shown in FIG. 7, the filter units are identical in construction. Adjacent filter units slope in opposite directions so that the adjacent filter units converge in a downstream direction. The following description is limited to one filter unit 109, as shown in FIG. 7.

Filter unit 109 has a generally channel-shaped outer peripheral frame 111 carrying a filtering medium comprising a charcoal bed 112 and an oxidizer medium 113. The oxidizer medium 113 is located adjacent the downstream side of charcoal bed 112.

Oxidizer medium 113 may comprise a medium consisting of an activated alumina impregnated with potassium permanganate. This medium is in the form of dry pellets and attracts gaseous contaminants and reacts with the gases by an oxidization process to neutralize the odors and contaminants. The oxidization is chemical and does not involve high temperatures. The controlled chemical oxidization is known as "odoroxidant." An example of this material is disclosed in U.S. Pat. No. 3,049,339. Other types of odor removing oxidizers can be used. For example, a filter having a catalyst embedded in an open cell, surface active and hydrophilic flexible urethane foam. A suitable catalytic odor control material is sold under the trade name "Sanilan."

Filter units 109 are removably mounted on a bottom support 114 and top support 119. The bottom support 114 has upwardly and outwardly directed flanges 116 and 117 and longitudinally central upright rib 118. The frame 111 fits between rib 118 and an outside flange. The top support 119 has outwardly and rearwardly extended flanges 121 and 122 and an outwardly extended central rib 123 located between flanges 121 and 122. The top portion of frame 111 fits between rib 123 and an outside flange. The filter units 109 slide into the channels formed by the ribs and flanges and are held in their angular position by the ribs and flanges.

As shown in FIG. 6, the front of the hood 29 is closed with an elongated front door 124. The top edge of door 124 is secured to a plurality of hinges 126 which pivotally mount the door to the housing. A latch 127 functions to hold the door in the closed position. Door 124 can be pivoted or swung to the open position, as shown in broken lines. This makes the filter units 109 readily accessible for inspection, maintenance and replacement.

Located downstream from the secondary filter arrangement 108 are a series of side-by-side high efficiency filters indicated generally at 128. The high efficiency filters are known as HEPA filters. These filters using a medium of dry, ultra-fine fibers 129. The fibers may be 100 percent glass fibers or a combination of glass and asbestos fibers. As shown in FIG. 8, the medium is formed in a thin porous sheet which is pleated or fan-folded to form pockets. The medium 129 is assembled in a rigid, box-like frame 131. As shown in FIG. 7, frame 131 is supported on the top supports 119. The top wall of frame 131 is in close proximity to the top wall 132 of the hood housing. A plurality of side-by-side HEPA filters 128, shown in FIG. 1, extend across the top of the hood 29. The high efficiency filters 128 function to remove the small particles, bacteria and viruses from the air moving through the filter. The filters utilize all mechanisms of particle capture and retention. The most significant mechanism is diffusion. The filters are effective in this environment as substantially all of the larger particles are removed by the primary filter 101 and the secondary filter arrangement 108.

Referring to FIG. 3, the high efficiency filters 128 are located transversely across the forward portion of the top of hood 29. Located rearwardly of the filters 128 is a transverse chamber 133. Air moving means 134 and 136 are located at opposite ends of the chambers. The air moving means 134 and 136 can be electric motor driven fans. For example, a centrifugal blower connected to the drive shaft of an electric motor can be used to draw air through the hood assembly. Air moving means 134 is operable to discharge air through the discharge outlet 137. In a similar manner, air moving means 136 is operable to discharge air through the air outlet 138. Outlets 137 and 138 are rectangular grill structures, as shown in FIG. 2. Clean air is discharged laterally of the hood into the environment surrounding the cooking equipment.

Referring to FIG. 11, there is shown the electrical-mechanical diagram of the filtering monitoring and the air moving means controls for the air cleaning system of the invention. Air pressure sensors 140, 141, 142 and 143 are located on opposite sides of the primary filter 101, the secondary filter arrangement 108, and the HEPA filter 128. The pressure sensors 140–143 are operable to sense the air pressure differential between the inlet and outlet sides of each of these filters. Separate lines or tubes connect the pressure sensors 140–143 to a panel 144 mounted on the front of the hood assembly shown in FIG. 1. Panel 144 has a plurality of gauges 146 providing information to the pressure differential across the filters. The pressure sensors 140 and 141 are connected with lines to a pressure operated switch 147. When the pressure difference between the sensors 140 and 141 reaches a predetermined level the switch 147 will close and energize an audio-alarm 148 and a warning light 149. Switch 147 is connected to a power source with a main switch 151. Main switch 151 is connected to the thermo switch 84 which in turn is connected to the fire damper actuating solenoid 78. When the thermo switch 84 is activated the power source is connected to the solenoid 78. This energizes the solenoid and closes the damper plate 52. Thermo switch 84 is connected to a manual swith 152 leading to a power relay 153 which includes switch 90. Manual switch 152 can be actuated to disconnect the power to the blower motor 154. Blower motor 154 is connected to an SCR module 156. Relay 153 operates to connect the SCR module 156 to a high voltage power source.

The SCR module 156 is connected to the line leading to a motor speed control unit indicated generally at 157. Control unit 157 is operable to change the speed of the motor 154 so that a relatively constant amount of air is moved through the air cleaning apparatus. As the filters collect dirt they impede the flow of air through the hood assembly. The speed of the motor 154 is increased so that the volume of air moving through the hood assembly remains relatively constant throughout the period of use of the system. Control unit 157 has a reversible electric motor 158 connected to a spring loaded clutch 159. The output shaft of the clutch is connected to a speed control circuit 161 operable to energize the SCR module 156. The motor 158 is connected to a high pressure switch 162 and a low pressure switch 163. The switches 162 and 163 are connected to a pitot tube 164 located behind the HEPA filter 128 with lines 166, as tubes, pipes and the like. The pitot tube 164 senses the pressure of the air moving from the HEPA filter 128. The pressure differences sensed by the pitot tube 164 are transmitted via lines 166 to the high pressure switch 162 and the low pressure switch 163. These switches are operable to supply motor with energy whereby the motor operates the speed control circuit 161. The switch 163 is connected to a control switch 167. Switch 167 is manually connected to the speed control circuit 161 and will open the circuit and will close the circuit to a second warning light 168 and a second alarm 169. When the light 168 and the alarm 169 are activated the air flow through the apparatus is below a predetermined level. This is an indication that one or more filters are clogged to the extent that insufficient air flows through the apparatus.

Figure 12:
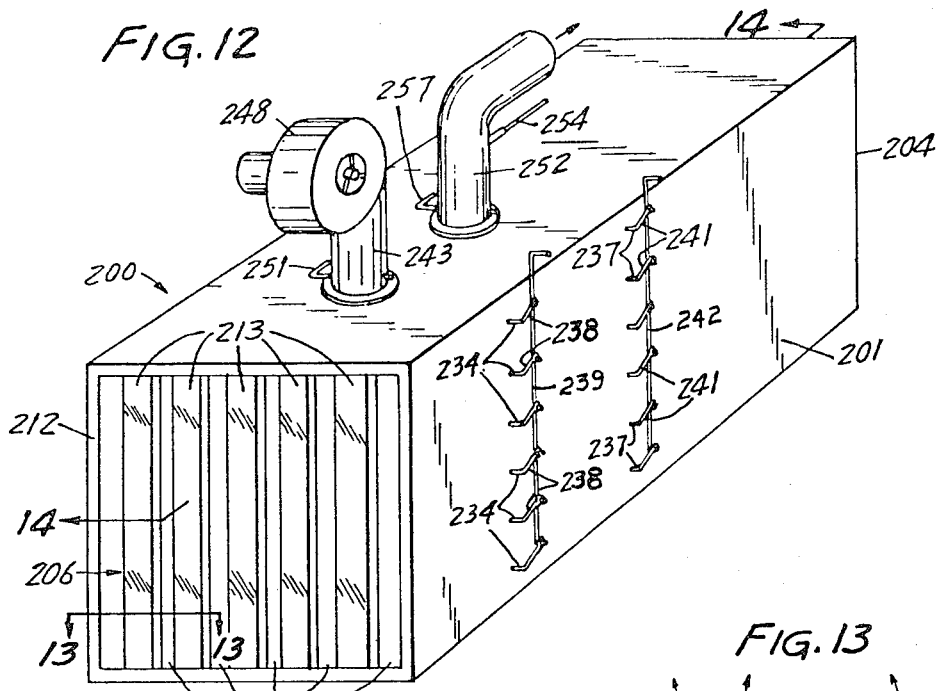
FIG. 12 is a perspective view of a modified form of the air cleaning system of the invention.
Figure 13:
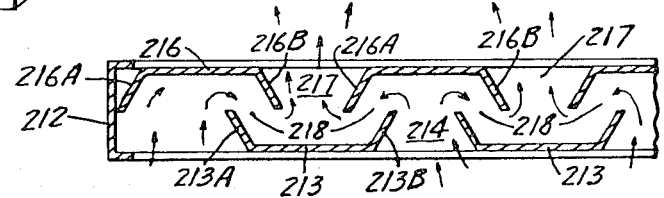
FIG. 13 is an enlarged sectional view taken along line 13—13 of FIG. 12.
Figure 14:
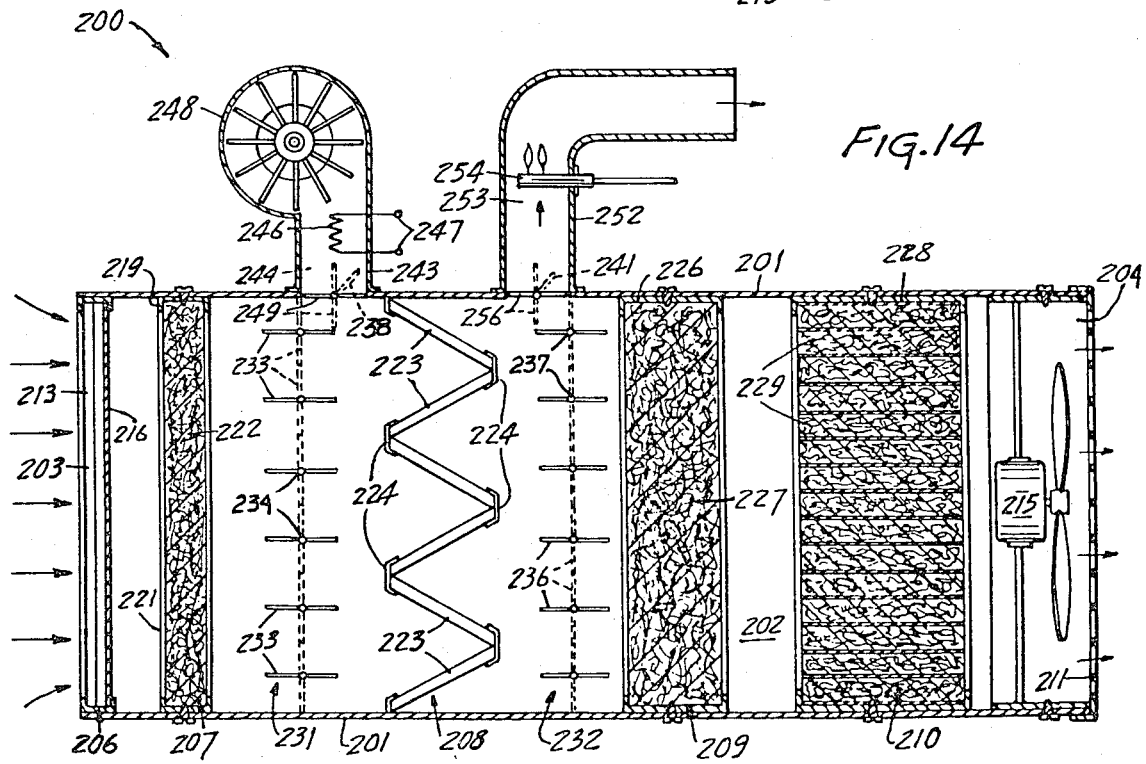
FIG. 14 is an enlarged sectional view taken along line 14—14 of FIG. 12.

Referring to FIG. 12, there is shown an air cleaning apparatus indicated generally at 200 for removing particulate material, odors, bacteria, viruses and the like from gaseous fluids. The apparatus 200 has an elongated housing 201 having a longitudinal passage 202. The front of housing 201 has a generally rectangular inlet opening 203. A similar outlet opening 204 is at the back of the housing. As shown in FIG. 14, a plurality of filtering means are located in the passage 202 to remove the contaminants from the air. The first filtering unit is a pre-filter indicated generally at 206 located in the inlet 203. Positioned behind pre-filter 206 is a primary filter 207 for removing particulates from the air. The next filter is a charcoal bed 208. Behind the charcoal bed is an oxidizing filter 209. The last filter is a high efficiency filter 210, such as a HEPA filter. The rear of the structure is closed with a grill 211 to protect the high efficiency filter. An air moving means 215, shown as an electric motor and fan, is located within housing 201 adjacent grill 211 to draw air through the apparatus.

The pre-filter 206 has a generally rectangular frame 212 carrying a plurality of vertical outside plates or baffles 213. Adjacent plates 213 are spaced from each other to provide vertically arranged inlet openings 214. Plates 216 are spaced from each other to provide vertical outlet openings 217. The front plates 213 have rearwardly and outwardly projected side flanges 213A and 213B extended the full length of the plates. The rear plates 216 have outwardly and forwardly directed side flanges 216A and 216B extended the full length of the plates and spaced from the adjacent flanges of the front plates 213. The space between the adjacent flanges is a vertical passage or throat 218 connecting the inlet openings 214 with outlet openings 217. The air flowing through the pre-filter 216 follows a tortuous reverse curved path. The changes in movement of the air as it flows through the pre-filter provide for separation of heavy particles, greases, lint and the like on the plates 213 and 216. The material collected on the plates flows to the bottom of the plates out of the path of movement of the air flowing through pre-filter 206.

The primary filter 207 is removably mounted on channel members 219 secured to the housing. The primary filter 207 has an outer peripheral frame 221 located in the channel of channel member 219. The frame 221 is attached to a filtering medium 222. Filtering medium 222 is a fibrous material, such as glass fibers.

The charcoal filter bed 208 comprises a plurality of angularly disposed charcoal filter units 223 mounted on transverse supports 224. Opposite ends of the supports are secured to the housing 201. The charcoal filter units 223 are transversely located across passage 202 and are in a vertical zigzag pattern.

The oxidizing filter 209 has an outer peripheral frame 226. A filtering medium 227 is mounted on frame 226. Filtering medium 227 comprises a medium consisting of an activated alumina impregnated with potassium permanganate. This medium is in the form of dry pellets and attracts gaseous contaminants and reacts with the gases by an oxidization process to neutralize the odors and contaminants. The oxidization is chemical and does not involve high temperatures. The controlled chemical oxidization is known as "odoroxidant." An example of this material is disclosed in U.S. Pat. No. 3,049,339. Other types of odor removing oxidizers can be used. For example, a filter having a catalyst embedded in an open cell, surface active and hydrophilic flexible urethane foam. A suitable catalytic odor control material is sold under the trade name "Sanilan."

The high efficiency filter 210 is a HEPA filter having a box-like frame 228. The filtering medium 229 is supported by frame 228.

Filtering medium 229 can be a dry ultra-fine fibrous material. The fibrous material may be 100 percent glass fibers or a combination of glass and asbestos fibers. The medium is in the form of thin porous sheets which are pleated or fan-folded to form pockets. The structure of HEPA filter 210 is illustrated in FIG. 8.

As shown in FIG. 14, charcoal filter bed 208 is located between a forward damper assembly 231 and a rear or downstream damper assembly 232. Damper assembly 231 has a plurality of movable doors or gates 233. Each gate is mounted on a transverse pivot shaft 234. The damper assembly 232 has a plurality of movable doors or gates 236. Each gate is mounted on a transverse pivot shaft 237. As shown in FIG. 12, the shafts 234 and 237 extend to the outside of housing 201. Arms 238 are attached to shafts 234. In a similar manner, arms 241 are attached to shafts 237. A common control rod 239 is connected to each of the arms 238 so that movement of the control rod will selectively open and close the dampers. A similar control rod 242 is connected to the outer ends of arms 241. The rods 239 and 242 can be selectively moved to open the gates 233 and 236, as shown in full lines in FIG. 14, whereby air is free to flow through passage 202. Arms 239 and 242 can be moved to a closed position whereby the gates 233 and 236 are moved to the closed position shown in broken lines, thereby confining the charcoal filter bed 208 within its own chamber.

Mounted on the housing 201 is an upright tubular member 243 having a passage 244. Passage 244 is open to the passage 202 behind the damper assembly 231 and in front of charcoal filtering bed 208. A heating coil 246 located in passage 244 is used to heat the air in the passage. Heating coil 246 is connected to a source of electric power 247. An air moving means 248, such as a blower, is mounted on tubular member 243 and is operable to move air past the heating coils 246 and into passage 202 in front of the charcoal filtering bed 208.

The passage 244 into the housing 201 can be closed with a damper 249. Damper 249 has a shaft connected to a control arm 251, as shown in FIG. 12. Control arm 251 is selectively movable to open and close damper 249.

A second generally upright tubular member 252 is mounted on housing 201. Tubular member 252 has a passage 253 open to passage 202 of the housing immediately behind the charcoal filtering bed 208 and in front of damper assembly 232. A burner 254, such as a gas burner, is located in the passage 253. The entrance to passage 253 has a damper 256. As shown in FIG. 12, a control rod 257 is secured to the shaft of the damper so that the damper 256 can be moved between its open and closed positions, as shown in broken and full lines in FIG. 14.

The damper assemblies 231 and 232 are used in conjunction with heater 246 and burner 254 to reactivate the charcoal in charcoal filter unit 223. In use, damper assemblies 231 and 232 are closed, thereby isolating the charcoal filters from the remaining filters of the air cleaning apparatus 200. Air moving means 248 is operated to move air through the charcoal filter units 223 and out the passage 253. The heating element 246 heats the air supplied to the charcoal filter bed 223. The air flows through the charcoal beds 223 and oxidizes and burns the materials and particulates that are collected in the beds. In other words, the hot air reactivates the charcoal beds. The gases from the reactivation of the charcoal beds flow out through passage 253. After burner 254 burns the combustible gases so that a minimum of pollutants are discharged into the atmosphere.

While there have been shown and described preferred embodiments of the invention, it is understood that changes in the structures, filtering mediums can be made by those skilled in the art without departing from the invention. The invention is defined in the following claims.

The embodiments of the invention in which an exclusive property or privilege is claimed are defined as follows:

1. An air cleaning apparatus comprising:
    a housing having a passage, an air inlet and air outlet in communication with the passage, means located in said passage for moving air through the passage, said air moving through the inlet and being discharged through the outlet,
    air pre-filter means located in the passage adjacent in inlet for removing particulates from the air moving through the pre-filter means,
    primary filter means located in the passage downstream from the pre-filter means for removing additional particulates from the air moving through said primary filter means,
    secondary filter means including charcoal bed filter means located in the passage downstream from the primary filter means for removing additional particulates from the air moving through the charcoal bed filter means, and, an oxidizer medium located in the passage downstream from the charcoal bed filter means to remove odors from the air moving therethrough,
    high efficiency filter means located in the passage downstream from the secondary filter means for removing small particulates from the air moving through said high efficiency filter means,
    damper means for closing said passage, said damper means being located between the pre-filter means and the secondary filter means, and,
    control means for holding the damper means open to permit air flow through the passage, said control means including temperature responsive elements for closing the damper means to prevent the flow of air through the passage.

2. The apparatus of claim 1 wherein: the control means further includes a manual operator to close the damper means.

3. The apparatus of claim 1 wherein: the primary filter means includes a filter having fiber filtering media.

4. The apparatus of claim 1 wherein: the housing has members to permit removal of the primary filter means, and a door providing access to the primary filter means.

5. The apparatus of claim 1 wherein: the oxidizer medium includes a wall of activated alumia impregnated with potassium permanganate.

6. The apparatus of claim 1 wherein: the high efficiency filter means is a HEPA filter.

7. The apparatus of claim 1 wherein: the means for moving the air through the passage is located in the passage downstream from the high efficiency filter means.

8. The apparatus of claim 1 including:
    further damper means positioned and arranged to close the passage between the charcoal bed filter means and the oxidizer medium, and means to supply hot air to the charcoal bed filter means to regenerate the charcoal therein.

9. The apparatus of claim 8 including: means to carry gases and materials from the charcoal bed filtering means, and burner means located in said means to carry gases and materials to burn the gases and materials flowing from the charcoal bed filter means during the regeneration of the charcoal thereof by the hot air.

10. The apparatus of claim 1 wherein: the pre-filter means has a plurality of spaced baffles, each baffle having side flanges.

11. The apparatus of claim 1 wherein: the secondary filter means comprise a plurality of oppositely inclined filter units containing said charcoal bed filter means and said oxidizer medium.

12. The apparatus of claim 1 including: said damper means is located in said passage between the primary filter means and the charcoal bed filter means and positioned and arranged to close said passage, and further including additional damper means located in said passage between the charcoal bed filter means and the oxidizer medium and positioned and arranged to close said passage, means to heat air, blower means to move the heated air from said means to heat air through said charcoal bed filtering means to regenerate the charcoal therein when both of said damper means are closed, means to carry gases and materials from the charcoal bed filtering means, and burner means located in said means to carry gases and material to burn said gases and materials.

13. The apparatus of claim 1 including: control means for the means for moving air through the passage operable to maintain a substantially constant flow of air through the passage.

14. The apparatus of claim 1 including: means to sense the air pressure differences across the primary filter means, the secondary filter means, and the high efficiency filter means.

15. An air cleaning apparatus comprising:
    a housing having a passage, an air inlet and air outlet in communication with the passage, means for moving air through the passage, said air moving through the inlet and being discharged through the outlet,
    primary filter means located in the passage adjacent the inlet for removing particulates from the air moving through said primary filter means, charcoal bed filter means located in the passage downstream from the primary filter means to remove particulates from the air moving through said charcoal filter means, first damper means located in said passage between the primary filter means and charcoal bed filter means positioned and arranged to close said passage, second damper means located in said passage downstream from the charcoal bed filter means and positioned and arranged to close said passage, means to heat air, blower means to move the heated air from said means to heat air through said charcoal bed filter means to regenerate the charcoal therein when the first and second damper means are closed, means to carry gases and materials from the charcoal bed filter means, burner means located in said means to carry gases and materials to burn said gases and materials, and high efficiency filter means located in the passage downstream from said second damper means for removing small particulates from the air moving through said high efficiency filter means when said first and second damper means are open.

16. The apparatus of claim 15 wherein: the housing has members to permit removal of the primary filter means, and a door providing access to the primary filter means.

17. The apparatus of claim 15 wherein: the high efficiency filter means is a HEPA filter.

18. The apparatus of claim 15 wherein: the means for moving the air through the passage is located in the passage downstream from the high efficiency filter means.

* * * * *

UNITED STATES PATENT AND TRADEMARK OFFICE
CERTIFICATE OF CORRECTION

PATENT NO. : 4,350,504
DATED : September 21, 1982
INVENTOR(S) : Wolodymyr Diachuk It is certified that error appears in the above-identified patent and that said Letters Patent are hereby corrected as shown below:

Column 1, line 10, "of" (first occurrence) should be --to--.

Column 1, line 29, "of" should be --or--.

Signed and Sealed this

Twenty-second Day of February 1983

[SEAL]

Attest:

GERALD J. MOSSINGHOFF

Attesting Officer     Commissioner of Patents and Trademarks